(12) United States Patent
Hwang et al.

(10) Patent No.: US 10,060,465 B2
(45) Date of Patent: Aug. 28, 2018

(54) ANTI-LOOSENING BOLT

(71) Applicants: Jae Pil Hwang, Busan (KR); Soon Dong Park, Busan (KR)

(72) Inventors: Jae Pil Hwang, Busan (KR); Soon Dong Park, Busan (KR)

( * ) Notice: Subject to any disclaimer, the term of this patent is extended or adjusted under 35 U.S.C. 154(b) by 0 days.

(21) Appl. No.: 15/328,026

(22) PCT Filed: Jul. 22, 2015

(86) PCT No.: PCT/KR2015/007594
§ 371 (c)(1),
(2) Date: Jan. 21, 2017

(87) PCT Pub. No.: WO2016/013863
PCT Pub. Date: Jan. 28, 2016

(65) Prior Publication Data
US 2017/0219003 A1 Aug. 3, 2017

(30) Foreign Application Priority Data

Jul. 23, 2014 (KR) .................. 10-2014-0093144

(51) Int. Cl.
*F16B 39/30* (2006.01)
*F16B 39/38* (2006.01)
*F16B 37/12* (2006.01)

(52) U.S. Cl.
CPC .............. *F16B 39/38* (2013.01); *F16B 39/30* (2013.01); *F16B 37/12* (2013.01)

(58) Field of Classification Search
CPC .................................. F16B 37/12; F16B 39/20

USPC .................................. 411/251, 252, 262, 438
See application file for complete search history.

(56) References Cited

U.S. PATENT DOCUMENTS

| | | | | | |
|---|---|---|---|---|---|
| 2,233,889 | A | * | 3/1941 | Hood | F16B 39/32 411/251 |
| 2,520,232 | A | * | 8/1950 | Bereza | F16B 25/0015 411/17 |
| 2,745,457 | A | * | 5/1956 | Lang | F16B 39/32 29/240 |
| 4,432,683 | A | * | 2/1984 | Polos | F16B 35/04 411/340 |
| 4,536,115 | A | * | 8/1985 | Helderman | B25B 27/143 411/17 |
| 4,581,871 | A | * | 4/1986 | Blucher | B26B 21/00 411/387.1 |
| 5,083,890 | A | * | 1/1992 | Gabilondo | F16L 47/16 411/411 |
| 8,747,042 | B2 | * | 6/2014 | Nagel | F16B 25/00 411/383 |

(Continued)

FOREIGN PATENT DOCUMENTS

| JP | 07-022117 U | 4/1995 |
|---|---|---|
| JP | 2000-145741 A | 5/2000 |

(Continued)

*Primary Examiner* — Flemming Saether
(74) *Attorney, Agent, or Firm* — Maschoff Brennan

(57) ABSTRACT

The present invention relates to an anti-loosening bolt coupled to a bolt and a spring and, more specifically, to an anti-loosening bolt which can: prevent the bolt from being unintentionally loosened by a rotating object or by continuous long-time or momentary vibration; be fixed on a wall; be combined with a nut; prevent a periodic shaking phenomenon; and be reused.

10 Claims, 7 Drawing Sheets

(56) References Cited

U.S. PATENT DOCUMENTS

2010/0028103 A1* 2/2010 Soeda .................... F16B 39/20
                                                       411/530

FOREIGN PATENT DOCUMENTS

| JP | 2001-059514 A | 3/2001 |
|----|---------------|--------|
| JP | 2008-298218 A | 12/2008 |
| KR | 20-1990-0020538 U | 12/1990 |
| KR | 10-2001-0017272 A | 3/2001 |

* cited by examiner

Prior Art

ANTI-LOOSENING BOLT

TECHNICAL FIELD

The present invention relates to an anti-loosening bolt coupled to a bolt and a spring and, more particularly, to an anti-loosening bolt that prevents the bolt from being loosened by instantaneous or continuous long-term vibration or by a rotating body, is fixed to a wall surface, is screw-coupled, prevents periodic vibration, and can be repeatedly used.

BACKGROUND ART

Generally, bolts and nuts couple two structures to each other or are used as a fastener which fasten a structure to another coupling body such that the coupling body penetrates a fastening hole with screw threads formed therein. In many cases, when such bolts are used for fastening, nuts are used alone to fix products and, when firm fixing is needed, double nuts or anti-loosening nuts are used.

As currently used anti-loosening nuts, U-type nuts, nylon nuts, Teflon nuts, spring washer nuts, T nuts (T-lock nuts), Nord-lock nuts, ERM nuts, double nuts, OT nuts, Hard-lock nuts, hyper nuts, and the like have been widely used in various applications and according to various methods.

As the related art, Korean Patent Application Registration No. 10-0701782 (ANTI-LOOSENING NUT, Registration date: Mar. 24, 2007) discloses an anti-loosening nut that can prevent a bolt from being loosened, by using a coil spring installed in an inner circumferential surface of the nut.

Although such technique for using an anti-loosening nut accommodating a bolt, as described above, is disclosed, the original fastening state is not maintained due to vibration, impact, or the like at a portion in which the bolt is fastened to a fastening hole formed in a parent material of a structure not requiring a nut and the bolt slides and is thus loosened.

In particular, an anti-loosening bolt, which is provided at a main body thereof with a tap for bonding a spring to accommodate a coil spring and prevents the bolt from being loosened, by a fastening force of the coil spring, is disclosed.

As the related art, Korean Patent Application Publication No. 10-2003-0000409 (ANTI-LOOSENING BOLT DEVICE, Publication date: Jan. 6, 2003) discloses an anti-loosening bolt device that prevents a bolt/nut fastened to a structure from being loosened.

However, when such anti-loosening bolts are used in main parts of railways on which vibration continuously occurs, connection parts of bridges, steel towers frequently shaken by wind, rides with a lot of shaking, and the like in which human safety is most important, the bolts are loosened and thus accidents frequently happen. In addition, when maintenance or checkup is needed, nuts must be unscrewed and fastened again, which makes handling or use thereof difficult.

DISCLOSURE

Technical Problem

Therefore, the present invention has been made in view of the above problems, and it is one object of the present invention to provide an anti-loosening bolt that can prevent the bolt from being loosened under various conditions regardless of use type, vibration intensity, and impact, can prevent the bolt from being loosened, by only simple assembly using an existing nut because a bolt member is not deformed when coupled, can be detached when replaced and thus the nut is reused, can be repeatedly used, and can prevent the bolt from being loosened when used alone even in a structure provided with only a fastening hole without a nut.

It is another object of the present invention to provide an anti-loosening bolt that prevents the bolt, which is a main body for fastening, from being loosened even when used for fastening using a nut and, accordingly, a fastening force of a nut-using structure or equipment can be rigidly maintained.

Technical Solution

In accordance with one aspect of the present invention, provided is an anti-loosening bolt including a screw part provided with screw threads at an outer circumferential surface thereof and a head positioned at a top end of the screw part and having a larger axial diameter than that of the screw part, wherein the screw part includes: a first member including a screw part with screw threads formed thereon; a second member extending therefrom at a rear end of the first member, having a smaller outer diameter than that of the first member, and including a screw part with screw threads formed thereon; and a coil spring accommodated over the second member, wherein the second member is provided with a coil spring accommodating groove at a rear end portion thereof, the coil spring is provided, at an end thereof, with a fixing part bent inward to a predetermined length, the fixing part being fixed to the coil spring accommodating groove of the second member, and the coil spring is inserted into a screw valley between the screw threads of the second member.

In addition, the coil spring has an oval or rectangular cross-section corresponding to an angle between the screw threads of the second member.

In addition, the coil spring has the same outer diameter as that of the screw thread of the first member and further includes a protruding needle formed at a top end portion thereof, wherein the protruding needle extends from the top end portion of the coil spring and protrudes outward to a certain length.

In addition, the coil spring has the same outer diameter as that of the first member and the same inner diameter as that of the second member, and the top end portion of the coil spring corresponds to a bottom end portion of the screw threads of the first member.

In addition, the coil spring further includes a ring having a ring shape or a semicircular shape extending therefrom at an end portion or one side portion of the fixing part thereof in a direction perpendicular to the coil spring.

In addition, the coil spring further includes a notch formed on a front side of the fixing part bent.

Advantageous Effects

As apparent from the fore-going description, the present invention advantageously provides an anti-loosening bolt that can prevent the bolt from being loosened under various conditions regardless of use type, vibration intensity, and impact, can prevent the bolt from being loosened, by only simple assembly using an existing nut because a bolt member is not deformed when coupled, can be detached when replaced and the nut is reused, can be repeatedly used, and can prevent the bolt from being loosened when used alone even in a structure provided with only a fastening hole without a nut.

In addition, the anti-loosening bolt is used in a general nut and fastening hole by simple installation and thus use thereof is not limited and anti-loosening effects may be achieved in various applications and, accordingly, the anti-loosening bolt is safe and economical. In addition, the anti-loosening bolt may be reused and thus maintenance thereof is easy.

In addition, the anti-loosening bolt has a simple structure and thus may be used in any place by an operator using generally used tools instead of specialized tools, resulting in increased operation efficiency and is resistant to vibration and thus has enhanced safety and fastening force.

BEST MODE

Hereinafter, exemplary configuration and function of the present invention will be described in detail with reference to the accompanying drawings.

Figure 1:
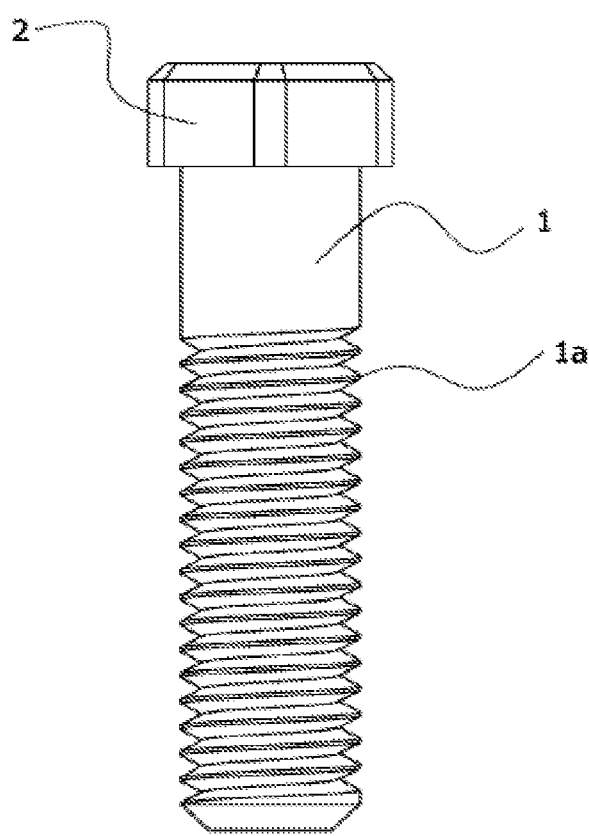
FIG. 1 is a schematic view illustrating a structure of a general bolt.

FIG. 1 is a schematic view illustrating a structure of a general bolt. The general bolt includes a screw part 1 provided with screw threads 1a at an outer circumferential surface thereof and a head 2 positioned at a top end of the screw part 1 and having a larger axial diameter than that of the screw part 1. The general bolt and a nut couple two structures to each other or is used as a fastener which fastens a structure to another coupling body such that the coupling body penetrates a fastening hole with screw threads formed therein.

Figure 2:
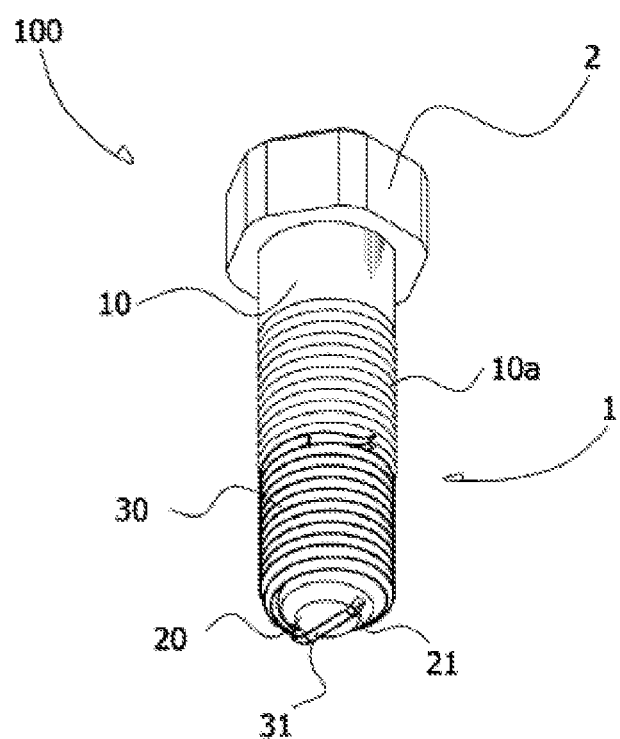
FIG. 2 is an overall perspective view of an anti-loosening bolt according to an exemplary embodiment of the present invention.
Figure 3:
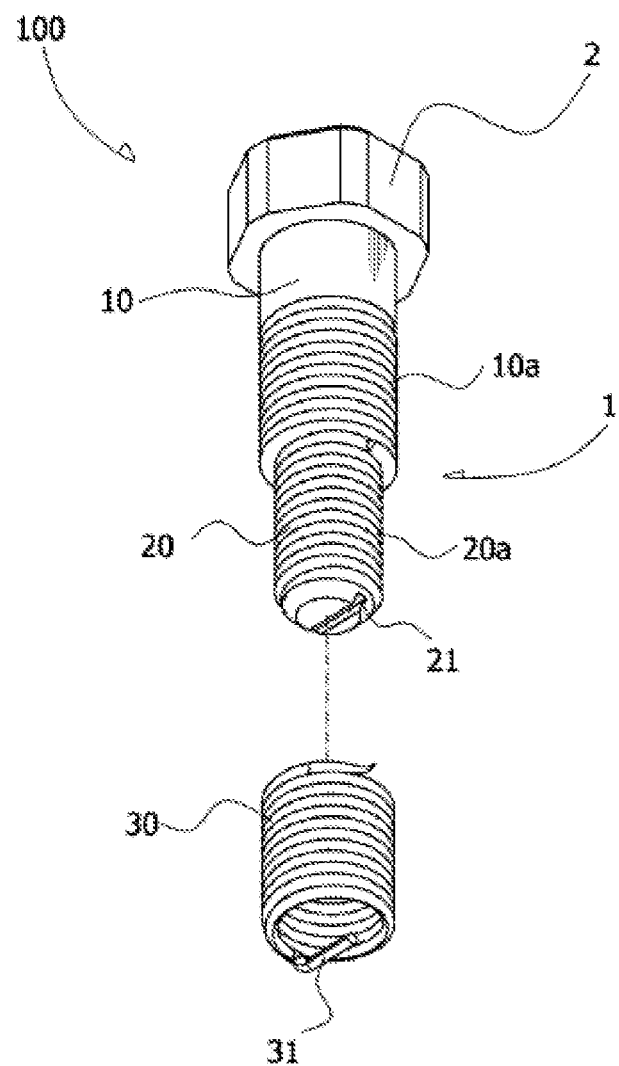
FIG. 3 is an exploded perspective view of the anti-loosening bolt of FIG. 2.
Figure 4:
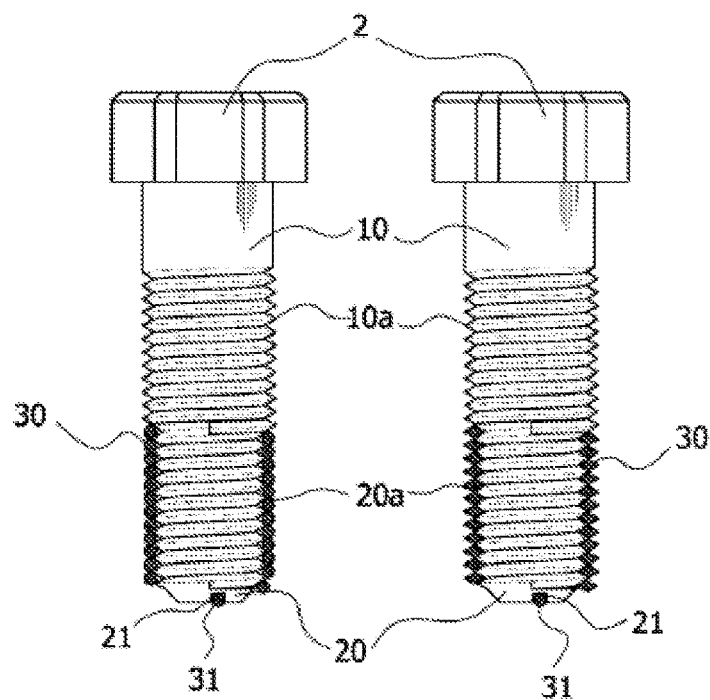
FIG. 4 is a cross-sectional view Fig of the anti-loosening bolt of FIG. 2.

FIG. 2 is an overall perspective view of an anti-loosening bolt according to an exemplary embodiment of the present invention. FIG. 3 is an exploded perspective view of the anti-loosening bolt of FIG. 2. FIG. 4 is a cross-sectional view of the anti-loosening bolt of FIG. 2. As illustrated in the drawings, in the anti-loosening bolt 100 according to the present invention, the screw part 1 includes a first member 10 with screw threads 10a formed thereon, a second member 20 extending therefrom at a rear end of the first member 10, having a smaller outer diameter than that of the first member 10, and provided with screw threads 20a at an outer circumferential surface thereof, and a coil spring 30 accommodated over the second member 20.

In this regard, the second member 20 is provided with a coil spring accommodating groove 21 at a rear end portion thereof, the coil spring 30 is provided, at an end thereof, with a fixing part 31 inwardly bent to a predetermined length, the fixing part 31 of the coin spring 30 is fixed to the coil spring accommodating groove 21 of the second member 20, and the coil spring 30 is inserted into a screw valley between the screw threads 20a of the second member 20 to be coupled thereto.

As such, by forming the coil spring accommodating groove 21 at the rear end portion of the second member 20, the fixing part 31 of the coil spring 30 is coupled thereto to thereby prevent rotation of the coil spring 30.

Meanwhile, the coil spring 30 may have an oval or rectangular cross-section corresponding to an angle between the screw threads 20a of the second member 20. In this regard, the oval cross-section may be formed such that an oval cross-section having a long horizontal axis corresponds to the screw thread. In addition, the coil spring may have a rectangular cross-section so as to more closely contact a coupling hole of a nut or a structure.

Figure 5:
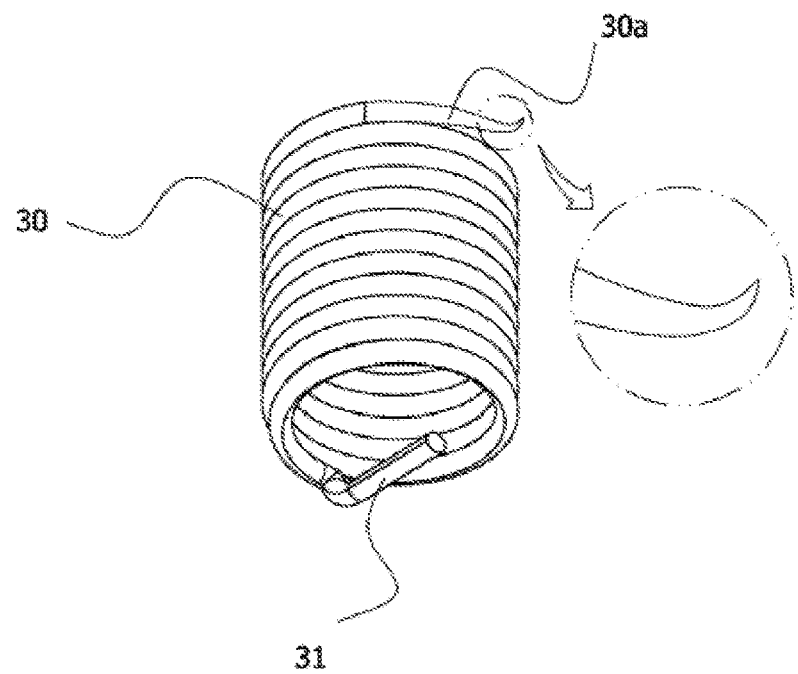
FIG. 5 is a perspective view of a coil spring of an anti-loosening bolt according to an exemplary embodiment of the present invention
Figure 6:
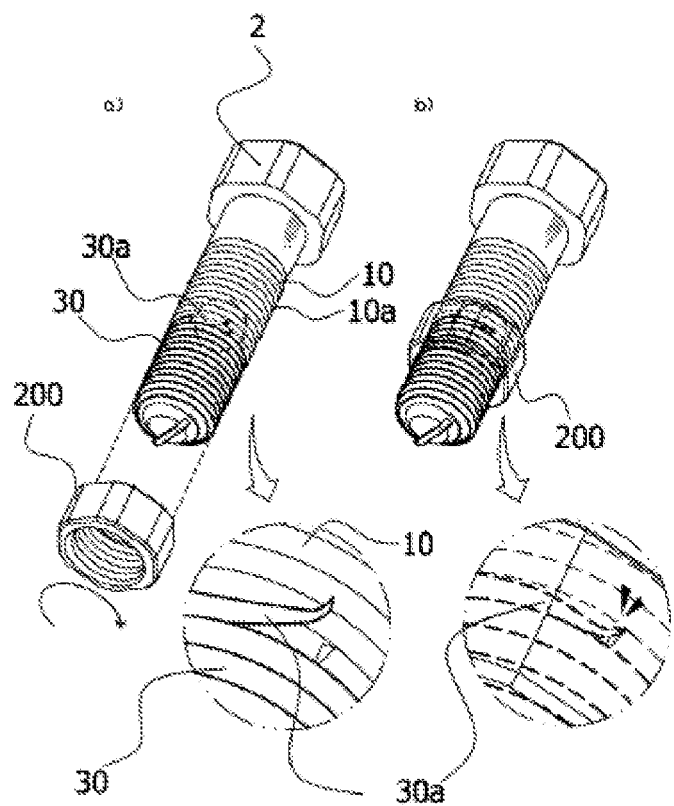
FIG. 6 is a view illustrating a use of the coil spring of FIG. 5.

FIG. 5 is a perspective view of a coil spring of an anti-loosening bolt according to an exemplary embodiment of the present invention. FIG. 6 is a view illustrating a use of the coil spring of FIG. 5. The coil spring 30 of the anti-loosening bolt according to the present invention has the same outer diameter as that of the screw thread 10a of the first member 10 and is provided with a protruding needle 30a at a top end portion thereof.

In this regard, the protruding needle 30a extends from the top end portion of the coil spring 30 and protrudes outside in an arc form to a certain length and may have a larger outer diameter than that of the first member 10. In addition, an end portion of the protruding needle 30a may be bent outward at a predetermined angle to face outward. In this regard, the end portion of the protruding needle 30a may be positioned on the same line as a top end portion of the screw threads 10a of the first member 10 to correspond thereto and may be formed within an angle between screw threads of a coupling hole formed in a parent material of a nut or a structure.

By using the protruding needle 30a, when coupled to a fastening hole of a nut or a structure, the protruding needle 30a corresponds to the screw valley of the second member 20 by elasticity, which enables normal coupling. In addition, an outer diameter of the coil spring 30 is changed by plasticity thereof and frictional force occurs according thereto and the protruding needle 30a is stuck and, accordingly, the anti-loosening bolt 100 according to the present invention has an anti-loosening effect.

Figure 7:
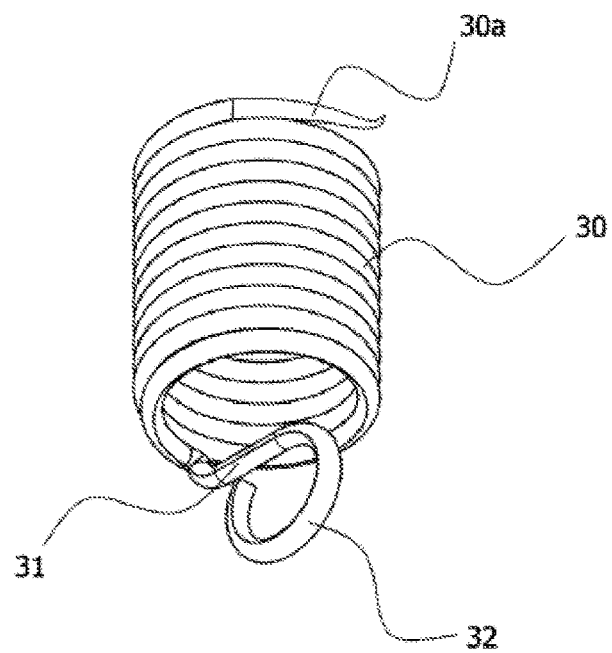
FIG. 7 is a perspective view illustrating another example of the coil spring of the anti-loosening bolt of FIG. 5.
Figure 8:
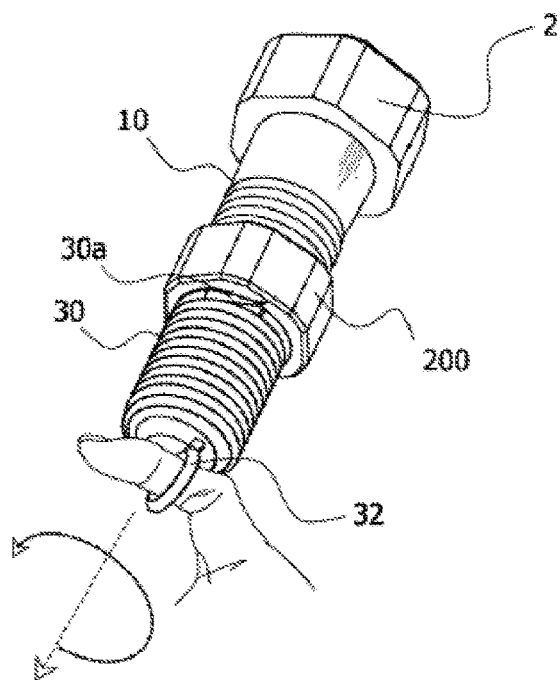
FIG. 8 is a view illustrating a use of the coil spring of FIG. 6.

FIG. 7 is a perspective view illustrating another example of the coil spring of the anti-loosening bolt of FIG. 5. FIG. 8 is a view illustrating a use of the coil spring of FIG. 7. The coil spring 30 may be provided, at an end portion or one side portion thereof, with a ring 32 extending therefrom in a direction perpendicular to the coil spring 30. In this regard, the ring 32 has a ring shape or a semicircular shape so that a user can grab the ring 32 with a finger or using a tool.

When the ring 32 is pulled, the fixing part 31 is detached from the coil spring accommodating groove 21 by elasticity of the coil spring 30 and, when the coil spring 30 is turned in a direction opposite to the screw, the coil spring 30 is detached from the screw threads to thereby allow a user to release the coupled state. Afterwards, the coil spring 30 is coupled in the reverse order, which enables reuse thereof.

Figure 9:
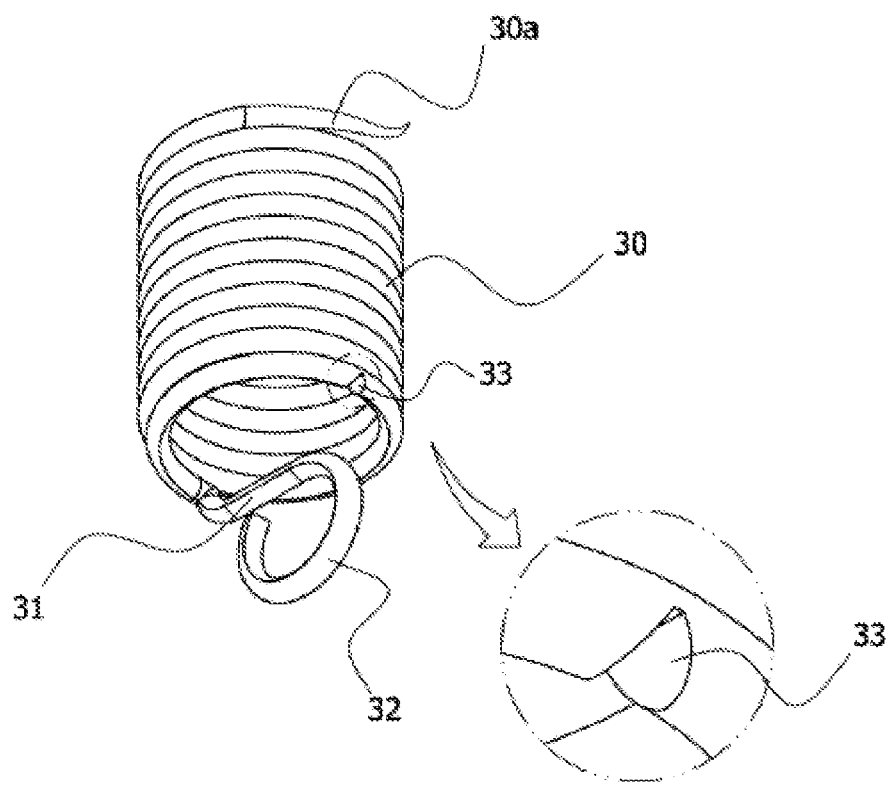
FIG. 9 is a perspective view of a coil spring of an anti-loosening bolt according to another embodiment of the present invention.

FIG. 9 is a perspective view of a coil spring of an anti-loosening bolt according to another embodiment of the present invention. The coil spring 30 may further include a notch 33 formed in front of the fixing part 31, which is bent.

As described above, the anti-loosening bolt 100 according to the present invention may be repaired after being unfastened, if needed. That is, the fixing part 31 of the coil spring 30 is fixed to the coil spring accommodating groove 21 and thus the coil spring 30 inserted into the second member 20 rotates as the head 2 rotates and is also involved in rotation of the screw threads in an opposite direction and thus, when the coil spring 30 is unfastened in the opposite direction of the screw threads, loosening of the coil spring 30 is prevented by the protruding needle 30a, which makes unfastening thereof impossible. Thus, to enable repair of the anti-loosening bolt 100, when the head 2 is rotated by force beyond the limit of elasticity of the coil spring 30, load is naturally transferred to the notch 33 formed on the second member 20 and thus the notch 33 is broken and, accordingly, a central point of power that supports the coil spring 30 is lost. Accordingly, the coil spring 30 is detached from the second member 20 to thus enable separate movement thereof so that the anti-loosening bolt 100 can be unfastened.

While the present invention has been described with reference to the aforementioned exemplary embodiments, it should be understood by those of ordinary skill in the art that various changes and modifications may be made without departing from the sprit and scope of the invention. In addition, such changes and modifications are within the scope of the claims appended hereto.

INDUSTRIAL APPLICABILITY

Bolts and nuts related to the present invention are components widely used on industrial sites and problems with loosening of bolts and nuts have occurred in various industrial environments. Meanwhile, according to the present invention, an anti-loosening bolt prevents the bolt from being loosened by instantaneous or continuous long-term vibration or by a rotating body, is fixed to a wall surface, is screw-coupled, prevents periodic vibration, and can be repeatedly used and thus has industrial applicability.

The invention claimed is:

1. An anti-loosening bolt comprising:
   a screw part provided with screw threads at an outer circumferential surface thereof and a head positioned at a top end of the screw part and having a larger axial diameter than that of the screw part, wherein the screw part includes:
      a first member including a screw part with screw threads formed thereon;
      a second member extending therefrom at a rear end of the first member, having a smaller outer diameter than that of the first member, and including a screw part with screw threads formed thereon; and
      a coil spring accommodated over the second member, wherein:
         the second member is provided with a coil spring accommodating groove at a rear end portion thereof,
         the coil spring is provided, at an end thereof, with a fixing part bent inward to a predetermined length, the fixing part being fixed to the coil spring accommodating groove of the second member, and
         the coil spring is inserted into a screw valley between the screw threads of the second member.

2. The anti-loosening bolt of claim 1, wherein the coil spring has an oval or rectangular cross-section.

3. The anti-loosening bolt of claim 2, wherein the coil spring further comprises a notch formed in front of the fixing part bent.

4. The anti-loosening bolt of claim 1, wherein:
   the coil spring has the same outer diameter as that of the screw thread of the first member and further comprises a protruding needle formed at a top end portion thereof, and
   the protruding needle extends from the top end portion of the coil spring and protrudes outward to a certain length.

5. The anti-loosening bolt of claim 4, wherein the coil spring further comprises a notch formed in front of the fixing part bent.

6. The anti-loosening bolt of claim 1, wherein the coil spring has the same outer diameter as that of the first member and the same inner diameter as that of the second member, and the top end portion of the coil spring corresponds to a bottom end portion of the screw threads of the first member.

7. The anti-loosening bolt of claim 6, wherein the coil spring further comprises a notch formed in front of the fixing part bent.

8. The anti-loosening bolt of claim 1, wherein the coil spring further comprises a ring having a ring shape or a semicircular shape extending therefrom at an end portion or one side portion of the fixing part thereof in a direction perpendicular to the coil spring.

9. The anti-loosening bolt of claim 8, wherein the coil spring further comprises a notch formed in front of the fixing part bent.

10. The anti-loosening bolt of claim 1, wherein the coil spring further comprises a notch formed in front of the fixing part bent.

* * * * *